United States Patent [19]

Meyer et al.

[11] 4,039,053

[45] Aug. 2, 1977

[54] PROTECTING DEVICE FOR THE CYLINDRICAL SLIDING SURFACES OF A DISC BRAKE

[75] Inventors: Yves Meyer, Taverny; Claude Le Marchand, Domont; Jean-Louis Gerard, Paris, all of France

[73] Assignee: Societe Anonyme D.B.A., Paris, France

[21] Appl. No.: 706,427

[22] Filed: July 19, 1976

[30] Foreign Application Priority Data

Aug. 8, 1975 France .............................. 75.24801
Jan. 23, 1976 France .............................. 76.01768

[51] Int. Cl.² ........................................ F16D 55/22
[52] U.S. Cl. ................................. 188/73.3; 188/1 R
[58] Field of Search ................. 188/1 R, 2 R, 71.8, 188/72.4, 73.3–73.5

[56] References Cited

U.S. PATENT DOCUMENTS

| 2,814,366 | 11/1957 | Lucien | 188/71.8 X |
| 3,155,200 | 11/1964 | Halibrand | 188/73.3 X |
| 3,186,521 | 6/1965 | Chouings | 188/71.8 X |
| 3,917,032 | 11/1975 | Hoffman, Jr. et al. | 188/73.3 |

Primary Examiner—Duane A. Reger
Attorney, Agent, or Firm—Ken C. Decker; William N. Antonis; Paul David Schoenle

[57] ABSTRACT

In a disc brake in which a movable member is slidably mounted on a fixed support member by means of at least one column at least one protecting device is associated to each column to prevent various particles such as mud, grease, etc. to be deposited on the sliding surfaces of the column. The protecting device includes a seal of resilient material which cooperates with the outside surface of the column by means of at least one lip, and which carries a rigid scraper element level with the outside surface of the column. The scraper element is mounted outside with respect to the lip of the seal to clean off the particles of solid materials in a first stage, the liquid particles being retained by the lip in a second stage.

14 Claims, 6 Drawing Figures

PROTECTING DEVICE FOR THE CYLINDRICAL SLIDING SURFACES OF A DISC BRAKE

The invention relates to a disc brake for an automotive vehicle.

More particularly the invention concerns a disc brake of the type in which a movable member is slidable on a support member by means of at least one column, actuating means being associated to said movable member to apply directly a first friction element on to a first face of a disc and, by reaction, a second friction element on to the other face of the disc, said column being associated to one of said members and emerging from at least one face of the other member.

When installed on a vehicle, the disc brakes of this type are such that, on wear of the linings of the friction elements, the movable members moves axially along the columns by very small amounts, so that various particles (mud, grease, etc) are deposited on the outside surfaces of the columns and must be dislodged when slight sliding of the movable assembly is required during operation of the brake. Consequently it is usual to protect the sliding surfaces of the columns by placing resilient sealing bellows, preferably of rubber, between the column and the face of the other member exposed to the atmosphere. However, as such bellows are subjected to large variations in temperature and in other enviromental factors and are sprayed with various substances, including grit, the bellows may perish and tear, so that the sliding surfaces are practically devoid of protection and relative sliding of the members may, if operating conditions are particularly bad, become completely impossible. In addition, the bellows are easily damaged when handled.

To overcome these disadvantages, the invention proposes a disc brake of the above description type characterized in that the protection of the sliding surfaces of the said column is provided by means of at least one protecting device comprising a seal of resilient material associated in a fluid tight manner with the said face of the other member and cooperating by means of at least one first lip with the outside surface of the column, the seal bearing on the side remote from the said face of the other member a scraper element, of rigid material which is level with the other outside surface of the column.

With this arrangement the sliding surfaces are cleaned in two stages. In the first stage the particles of solid materials deposited on the outside surface of the column are cleaned off by the scraper element, and in the second stage any liquid particles which have penetrated the first barrier constituted by the scraper element are retained by the lip on the seal. The novel arrangement may also provide self-centering of the scraper element of the column when the scraper element is mounted with radial clearance on the seal, whose resilience permits compensation of slight relative eccentricity of the scraper element and column.

In a particular embodiment of the invention, a film of lubricant is inserted between the sliding surfaces. A groove can then be formed in the inside surface of the member to form a reservoir for lubricant. In this case the seal may cooperate with the outside surface of the column by means of a second lip. This second lip prevents the film of lubricant from escaping to the exterior, whereas the first lip, as already stated, protects the sliding surfaces from liquid contamination from the exterior.

According to a further embodiment of the invention, the scraper element is mounted in a groove in the seal. In this case, at least one portion of the groove and one corresponding portion of the scraper element are substantially in the shape of a truncated cone. This characteristic permits to substantially reduce the radial size of the seal, which is very important in a disc brake for the reason that the place provided for the brakes in a vehicle is very limited. Furthermore, this characteristic avoids the risk of axial escape of the scraper element, and the reduction of the radial size of the seal permits to increase the axial stiffness of the device and thus to improve the damping action of the latter with respect to the column.

The invention will be now described, by way of example, with reference to the accompanying drawings in which.

Figure 1:
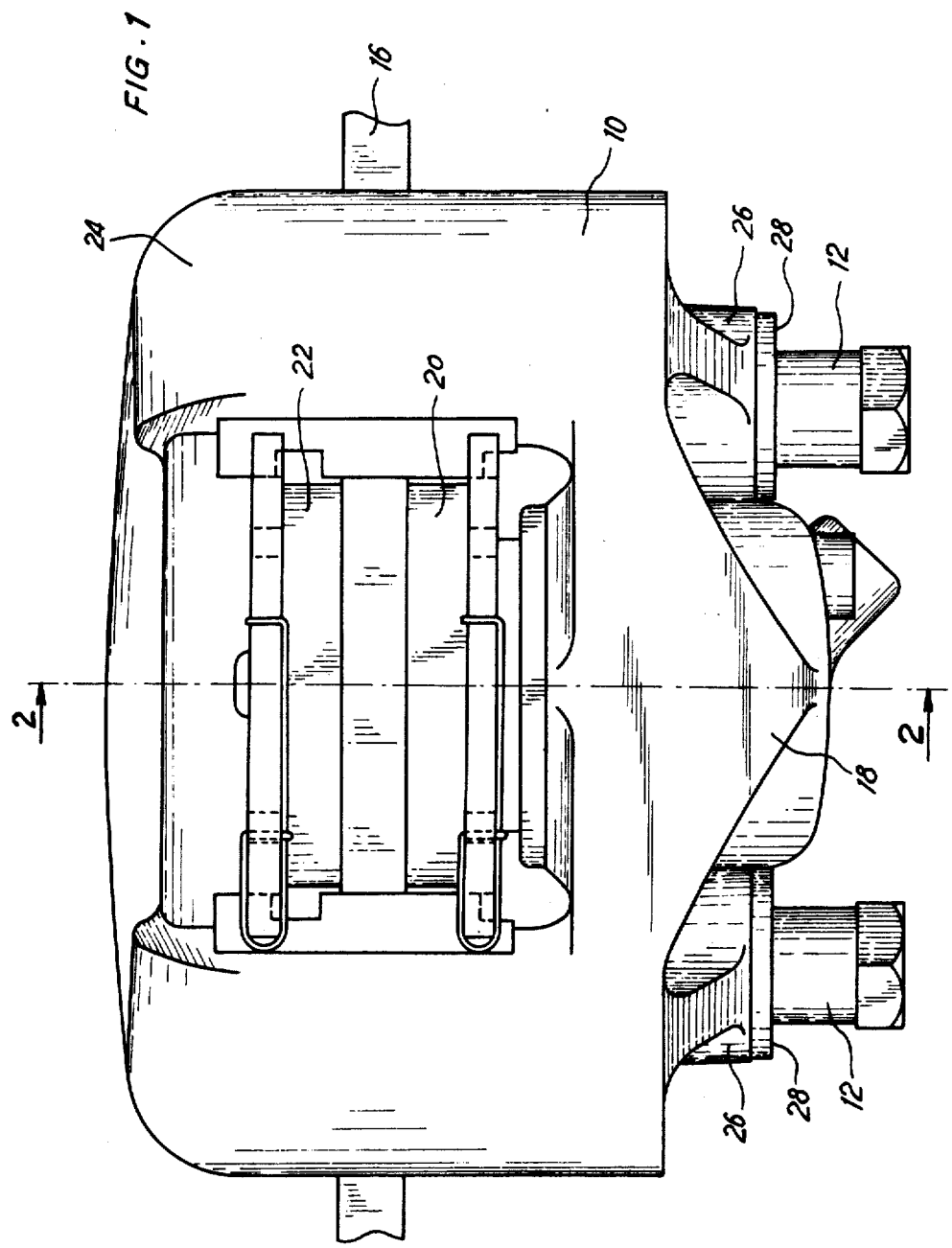
FIG. 1 is a plan view of a disc brake in which the columns are provided with protecting devices embodying the invention.
Figure 2:
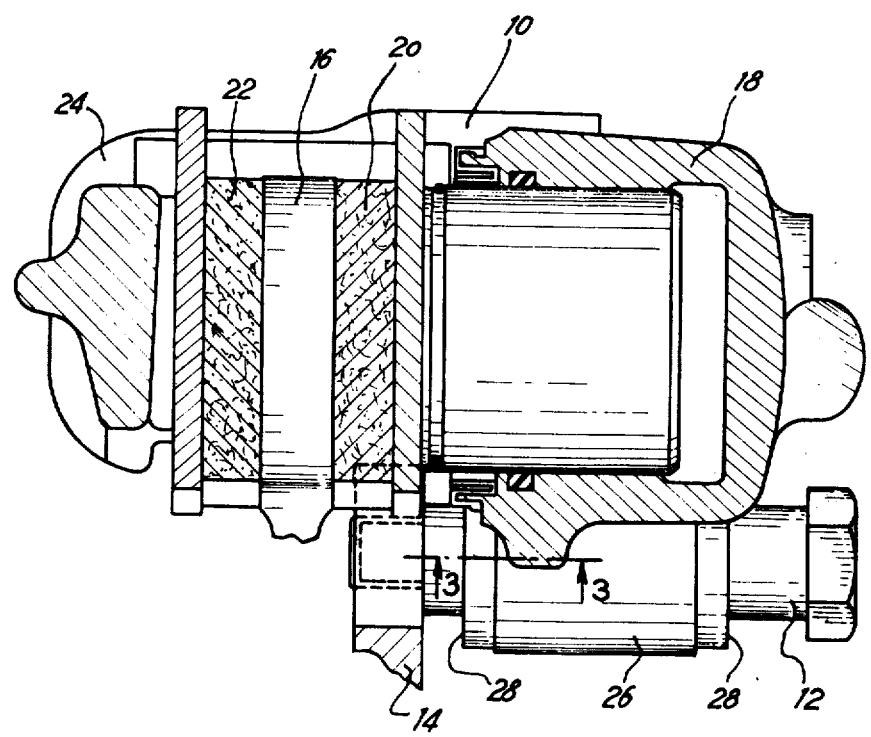
FIG. 2 represents a section along a line 2—2 in FIG. 1.

The disc brake shown in FIGS. 1 and 2 has a movable member 10 slidable by way of two columns 12 on a fixed support plate member 14 in the vicinity of the disc 16. The movable member 10 carriers a brake actuator 18 which urges a first brake friction element or pad 20 directly on the one side of the disc 16 and a second brake friction element or pad 22 by reaction on to the other side of the disc 16 by way of a caliper portion 24 straddling the disc. In the described embodiment, the pads 20, 22 are slidable and anchored on the caliper portion 24 so that, on opertion of the brake, the braking forces are transmitted from the friction elements 20 22 to the movable members 10 by way of the portion 24. The braking forces are then tramsmitted from the movable member 10 to the fixed support plate member 14 by way of the columns 12.

Figure 3:
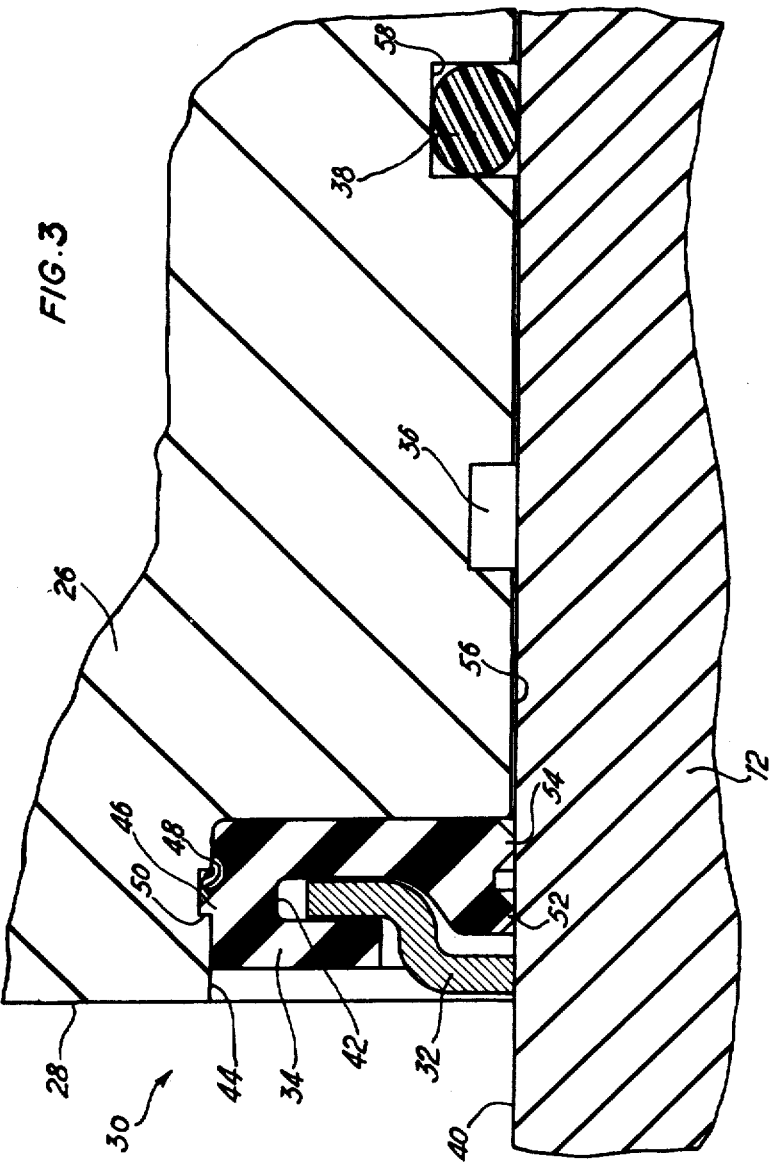
FIG. 3 is a section along a line 3—3 in FIG. 2 on a larger scale of one of the protecting devices used in the brake shown in FIGS. 1 and 2.

Each column 12 is received in a sleeve forming portion 26 extending the portion 24 radially inwards into the brake. Each of the columns 12 is also secured into the fixed support plate member 14 and merges from each of the faces 28 of the sleeves 26 associated with it. As FIG. 3 shows, a protecting device generally designated 30 is provided between the sliding surfaces of the columns 12 and sleeves 26 in the vicinity of each face 28. Each protecting device 30 comprises a scraper element 32, a seal 34, a lubricant reservoir 36 and a noise-reducing device 38. The scraper element 32 is a dish of rigid material, preferably corrosion-resistant such as stainless steel, and is level with the outside surface 40 of the column 12. The outer peripheral edge of the scraper element 32 is mounted with radial clearance in a groove 42 in the seal 34. The seal is mounted in a recess 44 in the face 28 of the sleeve 26, where it is held in position thanks to a bulge 46 on its outer periphery which bulge penetrates a corresponding annular depression 48 in the recess 44. In the described embodiment that edge 50 of the bulge 46 which faces the exterior of the recess 44, and also the corresponding edge of the depression 48, are substantially perpendicular to the sliding axis of the columns. The seal 34, which is made of resilient material, such as rubber, cooperates in a fluid-tight manner with the outside surface 40 of the column 12 by way of a first lip 52 and a second lip 54.

The lubricant reservoir 36 is an annular groove in the inside surface 56 of the sleeve 26. The noise-reducing device 38 is an O-ring seal mounted in a groove 58 in the inside surface 56 of the sleeve 26 and compressed on to the outside surface 40 of the column 12. Thus each protecting device 30 consists, proceeding from the assoicated face 28 along the outside surface 40 of its column 12, of a scraper element 32, the lips 52 and 54 of the seal 34, the lubricant reservoir 36, and the noise-reducing O-ring seal 38.

The protecting device just described operates as follows. In the event of a brake operation causing the movable member 10 to slide to the right viewing FIG. 2 to apply the pad 22 to the corresponding face of the disc 16, various particles such as mud, grease, moisture, etc., will have accumulated on the exposed portions of the surfaces 40 of the columns 12. Most of these particles are dislodged by the scraper element 32 which is level with the outside surface 40. Those particles which have not been detached by the element 32, which means in practice liquid particles, are then stopped by the lip 52 of the seal 34, so that the particles of dirt previously deposited on the surface 40 of the column 12 do not penetrate further into the sleeve 26. The embodiment described has a film on lubricant between the surfaces 40 and 56, and this film is retained throughout the life of the brake both by means of the reservoir 36, which ensures a supply of lubricant, and by means of the lip 54 of the seal 34 and the O-ring seal 38 which prevent the lubricant film from escaping to either side of the reservoir 36. In addition, in this embodiment, the O-ring seal 38 acts as a noise-reducing device for the columns and the sleeves 26, by preventing direct contact between the surfaces 40 and 56.

Because the scraper element 32 is mounted on the seal 34 with radial clearance, this element centres itself during assembly. This is further due to the resilience of the seal 34 which permits compensation of slight relative eccentricity of the column 12 and scraper element 32, which would not be the case if the latter were mounted directly on the sleeve 26. The special shape of the edge 50 of the bulge 46 also prevents creep of the rubber of the seal 34 and ensures a perfect seal between the sleeves 26 and seal 34. The dished shape of the scraper element 32 renders it more rigid and thereby improves its operation.

In the embodiment of the protecting devices shown in FIG. 4, the elements performing functions identical to elements described with reference to FIG. 3 are designated by the same reference numerals plus 100.

Figure 4:
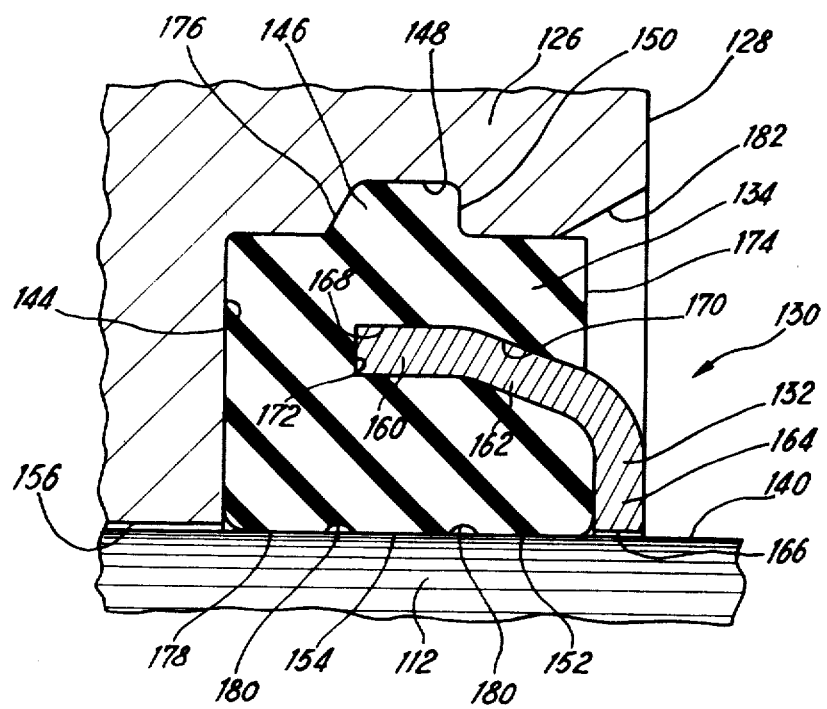
FIG. 4 is a view similar to FIG. 3 of another embodiment of the protecting device.

The protecting device shown in FIG. 4 is designated by the general reference 130. The device 130 is provided between the respective sliding surfaces 140 and 156 of a column 112 and of a sleeve portion 126 at the vicinity of one of the faces of the latter. The protecting device 130 comprises a scraper element 132 and a seal 134. The scraper element 132 is a dish of rigid material, preferably corrosion-resistant such as stainless steel, and is in section substantially L-shaped. One of the arms of the L comprises a substantially cylindrical portion 160 and a portion 162 in the shape of a truncated cone, while the other arm 164 extends radially towards the outside surface 140 of the column 112 to come level with a cylindrical surface 166. The portions 160 and 162 of the scraper element 132 are respectively mounted in the cylindrical portion 168 and in the portion 170 in the shape of a truncated cone of a groove 172 provided in the seal 134. The portion 170 of the groove 172 extends from the cylindrical portion 168 and emerge from the external face 174 of the seal 134 by its portion of smaller diameter. On mounting of the device 130, the scraper element 132 is forcibly engaged in the groove 172 in such a way that the cooperation between the portions 162 and 170 in the shape of truncated cones avoids the escape of the scraper element parallely to the axis of the column 112.

The seal 134 is mounted in a substantially cylindrical recess 144 provided on the face 128 of the sleeve 126, and it is locked thanks to a bulge 146 provided on its outer periphery and entering a corresponding annualr depression 148 in the recess 144. The edge 150 of the bulge 146 which faces the outside of the recess 144 and the corresponding edge of the depression 148 are substantially perpendicular to the sliding axis of the column 112, while the other edge 176 of the bulge 146 and the corresponding edge of the depression 148 are inclined to make easier the penetration of the seal 134 in the recess 144.

The seal 134, which is made of resilient material such as rubber, cooperates in a fluid-tight manner with the external surface 140 of the column 112 by way of three lips 152, 154 and 178. The lips 152, 154 and 178 are made of substantially cylindrical surfaces separated by two semi-circular grooves 180. A chamfer 182 is also provided at the input of the recess 144 in the sleeve 126 to make easier the penetration of the seal. It will be noticed that the seal 134 presents in section substantially the shape of a rectnagle, the greater side of which being parallel to the external surface 140 of the column 112.

Figure 5:
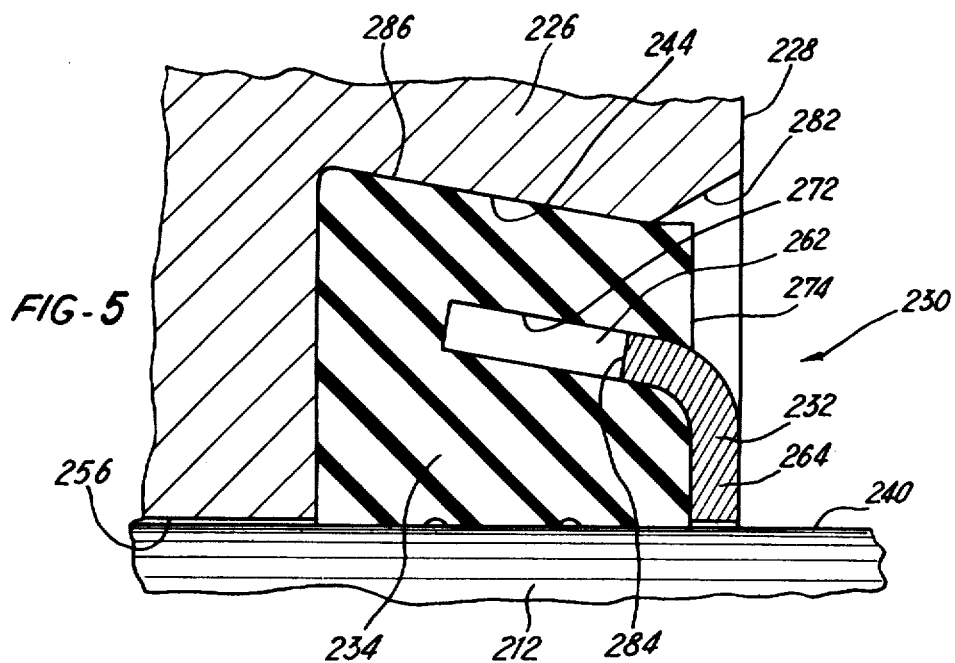
FIG. 5 is a view similar to FIGS. 3 and 4 of still another embodiment of the protecting device.
Figure 6:
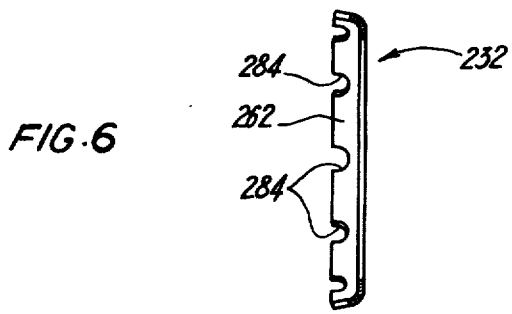
FIG. 6 represents a section of the scraper element used in the protecting device shown in FIG. 5.

In the protecting device shown in FIGS. 5 and 6, the elements performing the same functions as the elements of the embodiment shown with reference to FIG. 3 are designated by the same reference numerals plus 200.

The protecting device 230 shown in FIG. 5 is provided between the respective surfaces 240 and 256 of a column 212 and of a sleeve 226. The device 230 comprises a scraper element 232 and a seal 234, as in the previous embodiments. The scraper element 232 differs from the previous one in that it is only made of a portion 262 in the shape of a truncated cone and of a portion 264 extending substantially radially towards the outside surface 240 of the column 212. Furthermore, the portion 262 in the shape of a truncated cone comprises a plurality of circumferentially spaced semi-circular slots 284 surrounding its periphery of greater diameter as shown in FIG. 6. In the same way, the grooves 272 in the seal 234 has the shape of a truncated cone to forcibly receive the portion 262 of the scraper element 232 on mounting of the latter. The groove 272 emerges by its end of smaller diameter on the external face 274 of the seal 234.

In the particular embodiment shown in FIG. 5, the seal 234 is mounted in a recess 244 susbstantially in the shape of a truncated cone provided on the face 228 of the sleeve 226. The external surface 286 of the seal 234 is substantially in the shape of a truncated cone and its end of smaller diameter is provided at the vicinity of the external face 274 of the seal, thereby inhibiting a possible escape of the latter. As in the previous embodiment, a chanfer 282 is provided at the input of the recess 244 to make easier the penetration of the seal 234. In the embodiment shown with reference to FIG. 5 the corresponding generatrices of the surface in the shape of a truncated cone 286 and of the groove in the shape of a truncated cone 272 are substantially parallel.

The protecting devices 30, 130, 230 in all the described embodiments are fully located in the recesses provided in the respective sleeves 26, 126 and 226. Thanks to the disposition, of the devices 130 and 230 their radial sizes are substantially reduced, while their axial sizes is increased only a little amount towards the inside of the sleeve, i.e. that it does not require an increasement of the external length of the latter because the cooperating surfaces of the column and of the sleeve are relatively great relative to the size of the recess.

Both devices described with reference to FIGS. 4 to 6 may receive a reservoir for lubricant as well as a noise reducing seal as used in the embodiment shown with reference to FIG. 3.

What is claimed is:

1. A disc brake in which a movable member is slidable on a support member by means of at least one column; actuating means being assoicated to said movable member to apply a first friction element on to a first face of a disc and, by reaction a second friction element on to the other face of the disc, said column being assoicated to one of said members and emerging from at least one face to the other member, wherein the protection of the sliding surfaces of the said column is provided by means of at least one protecting device comprising a seal of resilient material assoicated in a fluid-tight manner with the said face of the other member and cooperating by means of at least one first lip with the outside surface of the column, the seal bearing on the side remote from the said face to the other member a scraper element of rigid material, said scraper element being mounted in a groove in said seal and extending from an external surface of said seal to said column.

2. A disc brake in which a movable member is slidable on a support member by means of at least one column; actuating means being assoicated to said movable member to apply directly a first friction element on to a first face of a disc and, by reaction a second friction element on to the other face of the disc, said column being associated to one of said members and emerging from at least one face of the other member, wherein the protection of the sliding surface of the said column is provided by means of at least one protecting device comprising a seal of resilient material associated in a fluid-tight manner with the said face of the other member and cooperating by means of at least one first lip with the outside surface of the column, the seal bearing on the side remote from the said face of the other member a scraper element of rigid material which is level with the outside surface of the column, said scraper element being mounted on the seal with radial clearance.

3. A disc brake in which a movable member is slidable on a support member by means of at least one column; actuating means being assoicated to said movable member to apply directly a first friction element on to a first face of a disc and, by reaction a second friction element on to the other face of the disc, said column being associated assoiciated to one of said members and emerging from at least one face of the other member, wherein the protection of the sliding surface of the said column is provided by means of at least one protecting device comprising a seal of resilient material assoicated in a fluid-tight manner with the said face of the other member and cooperating by means of at least one first lip with the outside surface of the column, the seal bearing on the side remote from the said face of the other member a scraper element of rigid material which is level with the outside surface of the column, said scraper being mounted in a groove in the seal and at least one portion of the groove and one corresponding portion of the scraper element being substantially in the shape of a truncated cone.

4. A disc brake according to claim 3, wherein the portion of the scraper element in the shape of a truncated cone emerges by its end of smaller diameter on the external face of the seal.

5. A disc brake according to claim 4, wherein the groove and the scraper element comprises a cylindrical portion extending from the portion in the shape of a truncated cone.

6. A disc brake according to claim 3, wherein the scraper element is substantially L-shaped one of the arms of which enters said groove, the other arm being bent radially towards the outside surface of the column.

7. A disc brake according to claim 6, wherein the arm of the scraper element which enters in the groove is in the form of a dish having a plurality of circumferentially spaced slots around its periphery of greater diameter.

8. A disc brake according to claim 3, wherein said seal also cooperates with the outside surface of the column by means of a second and a third lips.

9. A disc brake according to claim 8, wherein said lips are comprised of cylindrical surfaces separated by grooves.

10. A disc brake in which a movable member is slidable on a support member means of at least one column; actuating means being assoicated to said movable member to apply directly a first friction element on to a first face of a disc and, by reaction a second friction element on to the other face of the disc, said column being assoicated to one of said members and emerging from at least one face of the other member, wherein the protection of the sliding surface of the said column is provided by means of at least one protecting device comprising a seal of resilient material assoicated in a fluid-tight manner with the said face of the other member and cooperating by means of at least one first lip with the outside surface of the column, the seal bearing on the said remote from the said face of the other member a scraper element of a rigid material which is level with the outside surface of the column, said seal being mounted in a recess in the said face of the other member and said seal presents in section substantially the shape of a rectangle, and bears on its outer periphery at least one bulge capable of entering a corresponding depression in the recess.

11. A disc brake according to claim 8, wherein the bulge and depression are annular, their edges directed towards the exterior of the recess being substantially perpendicular to the axis defined by the sliding surfaces.

12. A disc brake in which a movable member is slidable on a support member by means of at least one column; actuating means being associated to said movable member to apply directly a first friction element on to a first face of a disc and, by reaction a second friction element on to the other face of the disc, said column being associated to one of said members and emerging from at least one face of the other member, wherein the protection of the sliding surface of the said column is provided by means of at least one protecting device comprising a seal of resilient material associated in a fluid-tight manner with the said face of the other member and cooperating by means of at least one first lip with the outside furface of the column, the seal bearing on the side remote from the said face of the other member a scraper element of rigid material which is level with the outside surface of the column, said seal being mounted in a recess in the said face of the other member, said seal presenting in section substantially the shape of a rectangle trapezium, the inclinded side of which cooperates with a peripheral surface of said recess.

13. A disc brake according to claim 12, wherein the corresponding generatrices of the peripheral surface of the recess and of the portion of the groove in the shape of a truncated cone are substantially parallel.

14. A disc brake in which a movable member is slidable on a support member by means of at least one column; actuating means being associated to said movable member to apply directly a first friction element on to a first face of a disc and, by reaction a second friction element on to the other face of the disc, said column being associated to one of said members and emerging from at least one face of the other member, wherein the protection of the sliding surface of the said column is provided by means of at least one protecting device comprising a seal of resilient material associated in a fluid-tight manner with the said face of the other member and cooperating by means of at least one first lip with the outside surface of the column, the bearing on the side remote from the said face of the other member a scraper element of rigid material which is level with the outside surface of the column, a film of lubricant being inserted between the sliding surfaces and a groove being formed in the inside surface of the other member to form a reservoir for the lubricant.

* * * * *